United States Patent
Jackson

(10) Patent No.: US 11,376,505 B2
(45) Date of Patent: *Jul. 5, 2022

(54) SYSTEMS AND METHODS FOR GENERATING IN-GAME ASSETS FOR A GAMING PLATFORM BASED ON INHERITING CHARACTERISTICS FROM OTHER IN-GAME ASSETS

(71) Applicant: Mythical, Inc., Sherman Oaks, CA (US)

(72) Inventor: Jamie Jackson, Seattle, WA (US)

(73) Assignee: Mythical, Inc., Sherman Oaks, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/862,185

(22) Filed: Apr. 29, 2020

(65) Prior Publication Data
US 2021/0101081 A1    Apr. 8, 2021

Related U.S. Application Data

(63) Continuation of application No. 16/592,578, filed on Oct. 3, 2019, now Pat. No. 10,682,575.

(51) Int. Cl.
| | |
|---|---|
| A63F 13/825 | (2014.01) |
| A63F 13/655 | (2014.01) |
| A63F 13/213 | (2014.01) |
| A63F 13/58 | (2014.01) |
| G06T 11/00 | (2006.01) |
| G06F 3/0482 | (2013.01) |
| A63F 13/533 | (2014.01) |
| A63F 13/537 | (2014.01) |
| A63F 13/35 | (2014.01) |

(52) U.S. Cl.
CPC .......... *A63F 13/655* (2014.09); *A63F 13/213* (2014.09); *A63F 13/58* (2014.09); *A63F 13/825* (2014.09); *G06T 11/00* (2013.01); *A63F 2300/8058* (2013.01); *G06F 3/0482* (2013.01)

(58) Field of Classification Search
CPC ............ A63F 13/825; A63F 2300/8058; A63F 13/655; A63F 13/58; A63F 13/213; G06T 11/00; G06F 3/0482
See application file for complete search history.

(56) References Cited

U.S. PATENT DOCUMENTS

| | | |
|---|---|---|
| 5,572,646 A | 11/1996 | Kawai |
| 6,171,189 B1 | 1/2001 | Katano |
| 6,213,871 B1 | 4/2001 | Yokoi |
| 6,251,010 B1 | 6/2001 | Tajiri |

(Continued)

*Primary Examiner* — Robert T Clarke, Jr.
(74) *Attorney, Agent, or Firm* — Esplin & Associates, PC

(57) ABSTRACT

Systems and methods for generating characters for a gaming platform based on inheriting characteristics from other characters are disclosed. Exemplary implementations may: store, in electronic storage, a set of character definitions that define visual representations of individual characters that can operate and interact within the gaming platform; present a user interface to a first player on a first client computing platform associated with the first player; receive user input from the first player; generate a new character definition based on the first character definition and the second character definition; and present the new character on the user interface.

20 Claims, 8 Drawing Sheets

(56) References Cited

U.S. PATENT DOCUMENTS

| | | |
|---|---|---|
| 6,251,012 B1 | 6/2001 | Horigami |
| 6,253,167 B1 | 6/2001 | Matsuda |
| 6,254,477 B1 | 7/2001 | Sasaki |
| 6,267,677 B1 | 7/2001 | Tajiri |
| 6,449,518 B1 | 9/2002 | Yokoo |
| 6,482,067 B1 | 11/2002 | Pickens |
| 6,814,662 B2 | 11/2004 | Sasaki |
| 6,832,955 B2 | 12/2004 | Yokoi |
| 7,025,675 B2 | 4/2006 | Fogel |
| 7,104,884 B2 | 9/2006 | Yokoi |
| 7,117,190 B2 | 10/2006 | Sabe |
| 7,179,171 B2 | 2/2007 | Forlines |
| 7,599,802 B2 | 10/2009 | Harwood |
| 7,690,997 B2 | 4/2010 | Van Luchene |
| 7,789,758 B2 | 9/2010 | Wright |
| 7,803,046 B2 | 9/2010 | Scott |
| 7,806,758 B2 | 10/2010 | Van Luchene |
| 7,867,093 B2 | 1/2011 | Wright |
| 7,970,663 B2 | 6/2011 | Ganz |
| 7,974,902 B2 | 7/2011 | Van Luchene |
| 8,241,099 B2 | 8/2012 | Blair |
| 8,262,471 B2 | 9/2012 | Van Luchene |
| 8,272,956 B2 | 9/2012 | Kelly |
| 8,313,364 B2 | 11/2012 | Reynolds |
| 8,328,611 B2 | 12/2012 | Sano |
| 8,328,643 B1 | 12/2012 | Osvald |
| 8,540,570 B2 | 9/2013 | Janis |
| 9,186,575 B1 | 11/2015 | Janis |
| 9,186,582 B2 | 11/2015 | Janis |
| 9,630,115 B2 | 4/2017 | Bambino |
| 10,252,166 B2 | 4/2019 | Bambino |
| 10,682,575 B1 | 6/2020 | Jackson |
| 10,881,960 B2 | 1/2021 | Bambino |
| 2001/0036851 A1 | 11/2001 | Sasaki |
| 2002/0082065 A1 | 6/2002 | Fogel |
| 2002/0082077 A1 | 6/2002 | Johnson |
| 2003/0119570 A1 | 6/2003 | Maroun |
| 2003/0166414 A1 | 9/2003 | Sako |
| 2003/0236119 A1 | 12/2003 | Forlines |
| 2004/0009812 A1 | 1/2004 | Scott |
| 2004/0053690 A1 | 3/2004 | Fogel |
| 2004/0204127 A1 | 10/2004 | Forlines |
| 2005/0243091 A1 | 11/2005 | Hong |
| 2007/0111795 A1 | 5/2007 | Choi |
| 2007/0176363 A1 | 8/2007 | Bielman |
| 2008/0045285 A1 | 2/2008 | Fujito |
| 2008/0274811 A1 | 11/2008 | Ganz |
| 2009/0149233 A1 | 6/2009 | Strause |
| 2011/0009190 A1 | 1/2011 | Scott |
| 2011/0039622 A1 | 2/2011 | Levenson |
| 2011/0039623 A1 | 2/2011 | Levenson |
| 2011/0256937 A1 | 10/2011 | Van Luchene |
| 2011/0263322 A1 | 10/2011 | Van Luchene |
| 2012/0083322 A1 | 4/2012 | Van Luchene |
| 2012/0238361 A1* | 9/2012 | Janis .................. A63F 13/52 463/31 |
| 2012/0238362 A1 | 9/2012 | Janis |
| 2012/0264511 A1 | 10/2012 | Marsland |
| 2012/0264520 A1 | 10/2012 | Marsland |
| 2013/0079143 A1 | 3/2013 | Mcguirk |
| 2013/0079145 A1 | 3/2013 | Lam |
| 2013/0102379 A1 | 4/2013 | Sargent |
| 2013/0109479 A1 | 5/2013 | Ganz |
| 2014/0114630 A1 | 4/2014 | Brave |
| 2021/0042819 A1 | 2/2021 | Zhang |

* cited by examiner

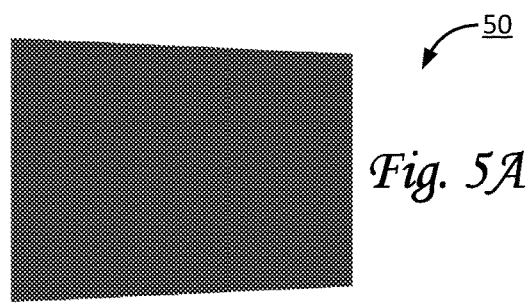
Fig. 5A
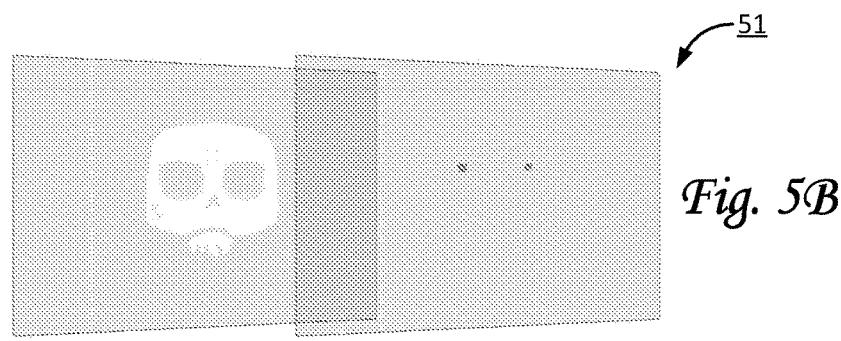
Fig. 5B
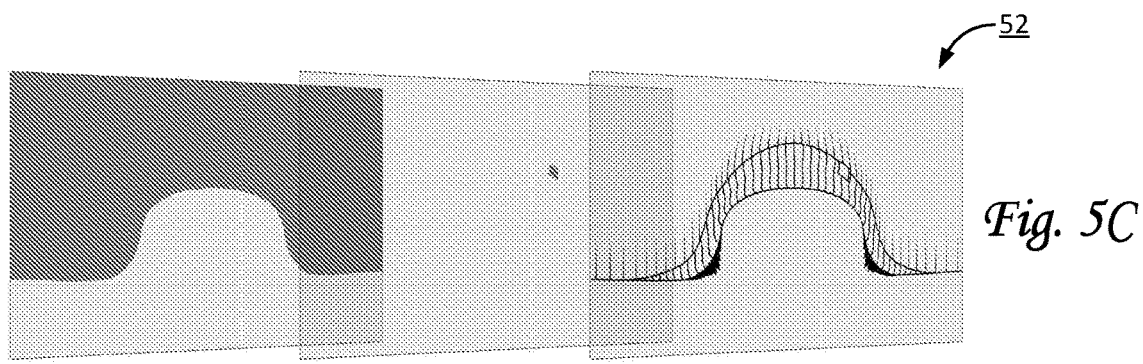
Fig. 5C
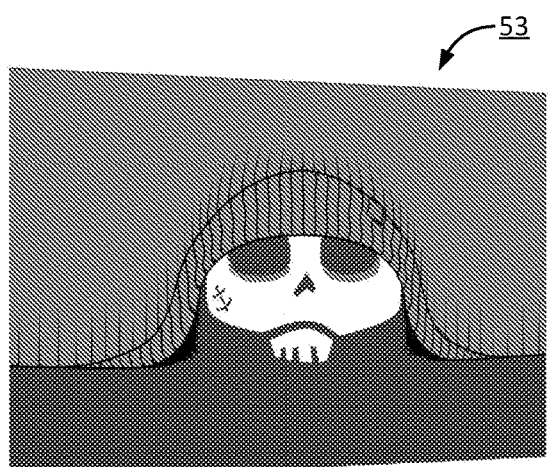 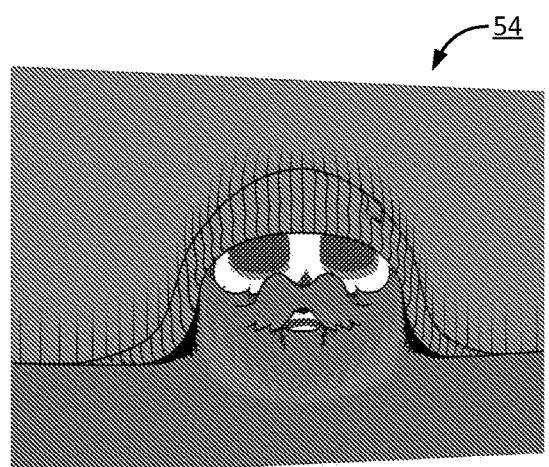
Fig. 5D Fig. 5E

SYSTEMS AND METHODS FOR GENERATING IN-GAME ASSETS FOR A GAMING PLATFORM BASED ON INHERITING CHARACTERISTICS FROM OTHER IN-GAME ASSETS

FIELD OF THE DISCLOSURE

The present disclosure relates to systems and methods for generating in-game assets, such as digital characters, for a gaming platform based on inheriting characteristics from other in-game assets.

BACKGROUND

Gaming platforms are known. Using characters and/or avatars within games is known, e.g., to represent players playing the game. Letting players customize at least some part of their characters is known.

SUMMARY

One aspect of the present disclosure relates to a system configured for generating in-game assets, such as digital characters, for a gaming platform based on inheriting characteristics from other in-game assets. As used herein, the term "character" and derivations thereof refer to any in-game assets, including but not limited to digital characters and/or other entities, individuals, and/or personalities. The system may include one or more hardware processors configured by machine-readable instructions. The processor(s) may be configured to store, in electronic storage, a set of character definitions that define visual representations of individual characters that can operate and interact within the gaming platform. Individual ones of the character definitions may include a hierarchical set of body component definitions that define primary body components and secondary body components organized in a hierarchy. Individual ones of the primary body components may include one or more secondary body components. The processor(s) may be configured to present a user interface to a first player on a first client computing platform associated with the first player. The user interface may display one or more of the individual characters in accordance with the visual representations defined by the set of character definitions. The set of character definitions may include a first character definition defining a first visual representation of a first character and a second character definition defining a second visual representation of a second character. The processor(s) may be configured to receive user input from the first player. The user input may include first user input that indicates a first selection of the first character to be used in generating a new character through inheritance. The first character definition may include a first primary body component definition that defines a first primary body component capable of being inherited by the new character in part or as a whole. The first character definition may further include a first secondary body component definition that defines a first secondary body component only capable of being inherited by the new character as a whole and not capable of being inherited by the new character in part. The user input may further include second user input from the first player that indicates a second selection of the second character to be used in generating the new character through inheritance. The processor(s) may be configured to generate a new character definition based on the first character definition and the second character definition. The new character definition may include a new hierarchical set of new body component definitions that define new primary body components and new secondary body components organized in a new hierarchy. Generating the new character definition may include, for individual ones of the new body component definitions, determining whether the new character definition inherits from the first character definition or the second character definition. The processor(s) may be configured to present the new character on the user interface. Presentation of the new character may be in accordance with a particular visual representation of the new character. The particular visual representation may be defined by the generated new character definition. Presenting the new character may include assembling individual ones of the new primary and secondary body components in order according to the new hierarchy.

Another aspect of the present disclosure relates to a method for generating in-game assets for a gaming platform based on inheriting characteristics from other in-game assets. The method may include storing, in electronic storage, a set of character definitions that define visual representations of individual characters that can operate and interact within the gaming platform. Individual ones of the character definitions may include a hierarchical set of body component definitions that define primary body components and secondary body components organized in a hierarchy. Individual ones of the primary body components may include one or more secondary body components. The method may include presenting a user interface to a first player on a first client computing platform associated with the first player. The user interface may display one or more of the individual characters in accordance with the visual representations defined by the set of character definitions. The set of character definitions may include a first character definition defining a first visual representation of a first character and a second character definition defining a second visual representation of a second character. The method may include receiving user input from the first player. The user input may include first user input that indicates a first selection of the first character to be used in generating a new character through inheritance. The first character definition may include a first primary body component definition that defines a first primary body component capable of being inherited by the new character in part or as a whole. The first character definition may further include a first secondary body component definition that defines a first secondary body component only capable of being inherited by the new character as a whole and not capable of being inherited by the new character in part. The user input may further include second user input from the first player that indicates a second selection of the second character to be used in generating the new character through inheritance. The method may include generating a new character definition based on the first character definition and the second character definition. The new character definition may include a new hierarchical set of new body component definitions that define new primary body components and new secondary body components organized in a new hierarchy. Generating the new character definition may include, for individual ones of the new body component definitions, determining whether the new character definition inherits from the first character definition or the second character definition. The method may include presenting the new character on the user interface. Presentation of the new character may be in accordance with a particular visual representation of the new character. The particular visual representation may be defined by the generated new character definition. Presenting the new character may include assembling individual ones of the new primary and secondary body components in order according to the new hierarchy.

As used herein, any association (or relation, or reflection, or indication, or correspondency) involving servers, processors, client computing platforms, users, players, definitions, representations, user interfaces, user input, selections, characters, hierarchies, presentations, probabilities, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 5A-5B-5C-5D-5E illustrate representations of (combinations of) body component definitions for a character as may be generated by a system configured for generating characters for a gaming platform based on inheriting characteristics from other characters, in accordance with one or more implementations.

DETAILED DESCRIPTION

Figure 1:
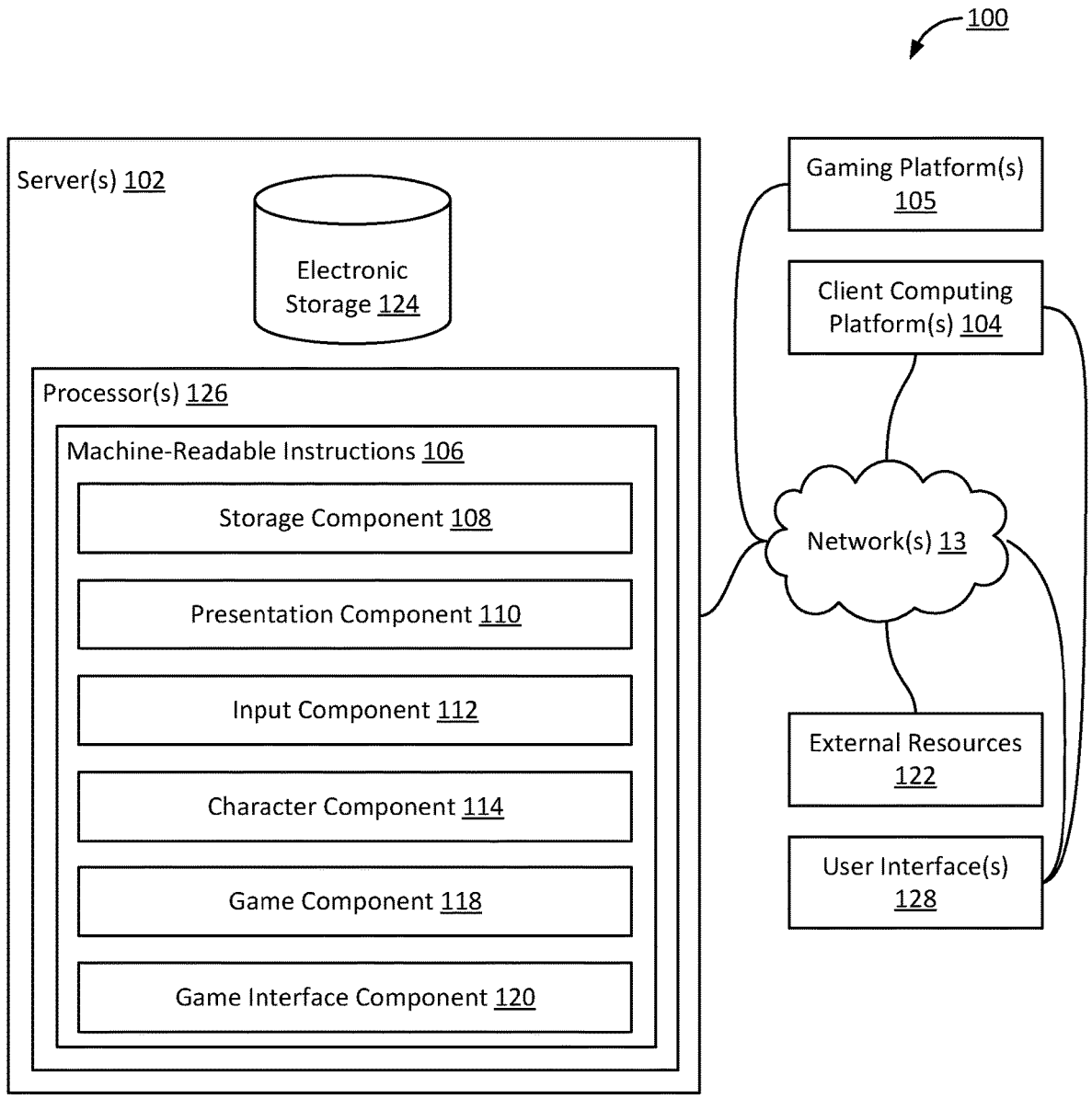
FIG. 1 illustrates a system configured for generating characters for a gaming platform based on inheriting characteristics from other characters, in accordance with one or more implementations.

FIG. 1 illustrates a system 100 configured for generating characters for one or more gaming platforms 105 based on inheriting characteristics from other characters, in accordance with one or more implementations. Newly generated characters may form the basis for additional generation of characters through inheritance, thereby establishing lineage and/or ancestry. As used herein, gaming platform 105 may refer to an individual (video) game, a type of gaming console and its ecosystem, one or more related games and their ecosystem, and/or a combination thereof. In some implementations, gaming platform 105 may be configured to provide and/or host one or more (online) games within system 100. As used herein, the term "digital characters" may refer to entities within gaming platform 105 that are in part or as a whole controlled by players, e.g., through client computing platforms 104. As such, players can play games and/or otherwise interact with gaming platform 105 as certain digital characters. Characteristics of an individual character may include visual features of the individual character, as well as visible and/or invisible attributes that may have an effect on gameplay and/or other interactions within gaming platform 105. For example, invisible attributes may include, without limitation, strength, constitution, dexterity, intelligence, wisdom, charisma, stamina, health level, experience, luck, and/or other attributes.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users and/or players may access system 100 via client computing platform(s) 104. In some implementations, client computing platforms 104 may be associated with players. The players may include a first player, a second player, a third player, and so forth. For example, the first player may be associated with a first client computing platform 104, the second player may be associated with a second client computing platform, and so forth.

Server(s) 102 may be configured by machine-readable instructions 106. Machine-readable instructions 106 may include one or more instruction components. The instruction components may include computer program components. The instruction components may include one or more of storage component 108, presentation component 110, input component 112, character component 114, game component 118, game interface component 120, and/or other instruction components.

Storage component 108 may be configured to store information in an electronic storage 124. Stored information may include a set of character definitions that define visual representations of individual characters, including individual characters that can operate and interact within gaming platform 105. In some implementations, stored information may be obtained from components external to system 100, including but not limited to external game servers. Individual ones of the character definitions may include a hierarchical set of body component definitions. Body component definitions may define colors, shapes, patterns, areas, regions, parts, and/or other components of bodies of characters, and/or their respective visual representations. For example, a first body component definition may define a first body component, a second body component definition may define a second body component, and so forth. In some implementations, a hierarchical set of body component definitions may be organized in a hierarchy of different levels. For example, a first level may include one or more primary body component definitions (for one or more primary body components), the second level may include one or more secondary body component definitions (for one or more secondary body components), the third level may include one or more tertiary body component definitions (for one or more tertiary body components), and so forth. In some implementations, the first level may be considered a higher level than the second level, and the second level may be considered a higher level than the third level. For example, an individual primary body component may include one or more secondary body components. For example, an individual secondary body component may include one or more tertiary body components, and so forth.

In some implementations, a hierarchical set of body component definitions may define one or more primary body components and one or more secondary body components organized in a hierarchy. For example, the primary body components of a particular character definition may include a (definition of a) head, and/or other primary body components. For example, the secondary body components of a particular (definition of a) head may include one or more eyes, and/or other secondary body components. In some implementations, individual ones of a secondary body component may include one or more tertiary body components.

Presentation component 110 may be configured to present user interfaces 128 to client computing platforms 104 associated with the players. For example, presentation component 110 may be configured to present user interface 128 to a first player on first client computing platform 104 associated with the first player. User interface 128 may display one or more individual characters in accordance with the visual representations defined by the set of respective character definitions. For example, the set of character definitions may include a first character definition defining a first visual representation of a first character, a second character definition defining a second visual representation of a second character, and so forth. In some implementations, presenting an individual character may include assembling the individual hierarchical set of body components (defined by the individual character definition of the individual character) in order (and/or per level) according to the individual hierarchy. For example, in some implementations, one or more body components may be assembled at a lower level prior to assembling one or more body components at a higher level. For example, body component definitions for eyes, nose, mouth, facial hair, and/or other elements and/or components at the "face level" of a character may be tertiary body component definitions. For example, body component definitions for (facial) skin, face, hair, hat/headwear, and/or other elements and/or components at the "head level" of a character may be secondary body component definitions. For example, body component definitions for head, torso, arms, legs, and/or other elements and/or component definitions at the "body level" of a character may be primary body component definitions. For example, in some implementations, tertiary and/or "face level" body components may be assembled prior to secondary and/or "head level" body components, which may be assembled prior to primary and/or "body level" body components. In some implementations, the order of the different levels in a hierarchy may be fixed, e.g., to ensure consistent presentations and/or results for newly generated characters. In some implementations, the order within the different levels in a hierarchy may be fixed, e.g., to ensure consistent presentations and/or results for newly generated characters. By way of non-limiting example, the level of tattoos or skin color may be defined as a lower level than facial hair or glasses, which may be defined as a lower level than headwear.

Figure 6:
FIGS. 6-7-8 illustrate representations of characters as may be used or generated by a system configured for generating characters for a gaming platform based on inheriting characteristics from other characters, in accordance with one or more implementations.
Figure 7:

By way of non-limiting example, FIGS. 6-7 illustrate representations of characters as may be used by system 100. For example, presentation component 110 may present user interface 128 to a particular player on a particular client computing platform 104 such that user interface 128 displays a character 60 shown in FIG. 6. Alternatively, and/or simultaneously, presentation component 110 may present user interface 128 to the particular player on particular client computing platform 104 such that user interface 128 displays a character 70 shown in FIG. 7.

Figure 3A:
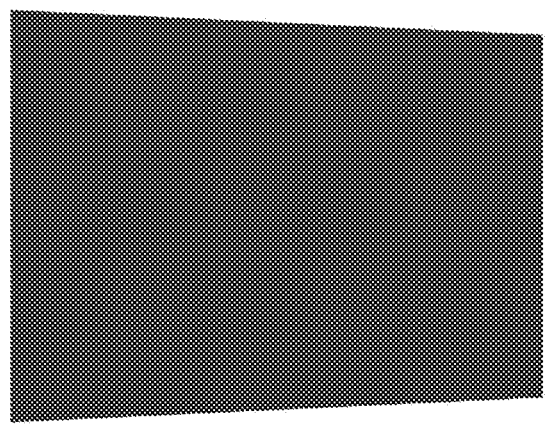
FIGS. 3A-3B-3C illustrate representations of (combinations of) body component definitions for a character as may be used by a system configured for generating characters for a gaming platform based on inheriting characteristics from other characters, in accordance with one or more implementations.
Figure 3B:
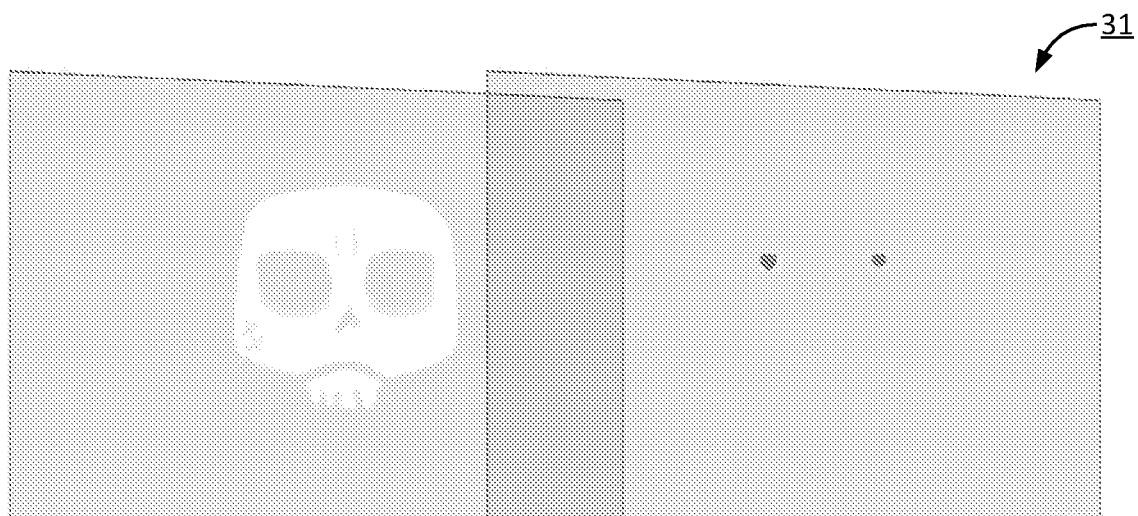
Figure 3C:
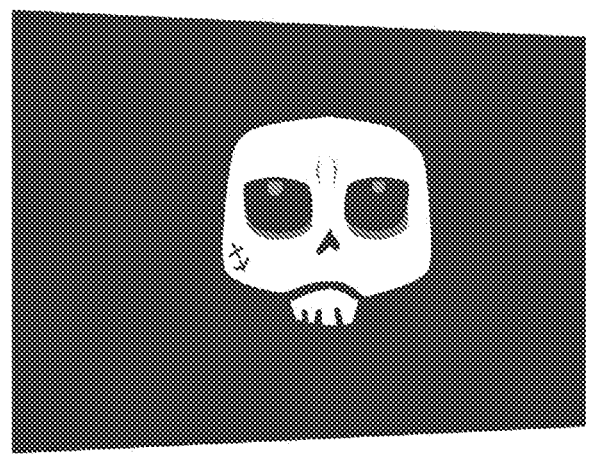

By way of non-limiting example, FIGS. 3A-3B-3C illustrate representations of (combinations of) body component definitions for a particular character (similar to character 60 in FIG. 6) as may be used by system 100. For example, the body component definition represented by representation 30 in FIG. 3A may be the skin color of the head of the particular character. For example, the body component definitions represented by representation 31 in FIG. 3B may be the face (left) and eyes (right) of the head of the particular character. For example, the body component definition represented by representation 32 may be a combination and/or assembly of the body component definitions shown in FIGS. 3A-3B.

By way of non-limiting example, FIGS. 4A-4B-4C-4D illustrate representations of (combinations of) body component definitions for a particular character (similar to character 70 in FIG. 7) as may be used by system 100. For example, the body component definition represented by representation 40 in FIG. 4A may be the skin color of the head of the particular character. For example, the body component definitions represented by representation 41 in FIG. 4B may be the eyes (41a and 41b) and facial hair (41c, 41d, and 41e) of the head of the particular character. For example, the body component definitions represented by representation 42 in FIG. 4B may be the color and shape of the hat of the particular character. For example, the body component definition represented by representation 43 may be a combination and/or assembly of the body component definitions shown in FIGS. 4A-4B-4C.

Referring to FIG. 1, input component 112 may be configured to receive user input from players. In some implementations, user input may be received through user interfaces 128. The user input may indicate one or more selections of one or more characters. For example, the user input may include first user input that indicates a first selection of a first character to be used in generating a new character through inheritance. For example, the user input may include second user input that indicates a second selection of a second character to be used in generating a new character through inheritance. For example, the user input may include third user input that indicates a third selection of a third character to be used in generating a new character through inheritance. In some implementations, generating one or more new characters may be based on two selected characters. In some implementations, generating one or more characters may be based on three or more selected characters. As used herein, the term "inheritance" may indicate that one or more characteristics of one character form the basis for one or more characteristics of another character. Inheritance may not need to imply that a newly generated character's characteristics are identical to those of one or more other characters.

Character component 114 may be configured to generate character definitions based on other character definitions. For example, a new character definition may be generated based on one or more character definitions of characters selected by a player, e.g., through input component 112. For example, a new character definition may be based on a first character definition and a second character definition. In some implementations, the new character definition may include a new hierarchical set of body component definitions that define primary body components, secondary body components, and/or tertiary body components, e.g., organized in a hierarchy.

Generating a new character definition may include determining that the new character definition inherits a particular primary body component defined by a particular primary body component definition, such that the new character definition includes a new primary body component definition. Generating the new character definition may include determining that the new character definition inherits a particular secondary body component defined by a particular secondary body component definition, such that the new character definition includes a new secondary body component definition. Generating the new character definition may include determining that the new character definition inherits a particular tertiary body component defined by a particular tertiary body component definition, such that the new character definition includes a new tertiary body component definition.

In some implementations, generating the new character definition may include, for individual ones of the new body component definitions, determining whether the new character definition inherits from the first character definition or the second character definition. In some implementations, determining whether a new character definition inherits from a first character definition or a second character definition may be performed stochastically and/or pseudo-stochastically in accordance with one or more probabilities. For example, a particular new character definition could randomly inherit 50% from the first character definition and 50% from the second character definition. In some implementations, probabilities may be based on user-controlled factors, game-play controlled factors, controlled by character designers, and/or based on other factors.

In some implementations, a particular character definition may include a particular primary body component definition that defines a primary body component capable of being inherited by new characters in part or as a whole. The inherited primary body component definition may be based on the particular primary body component definition in part or as a whole. In some implementations, a particular body component definition may be linked and/or otherwise connected to another body component definition, such that inheriting one implies inheriting the other.

In some implementations, a particular character definition may include a particular secondary body component definition that defines a secondary body component only capable of being inherited by new characters as a whole and not capable of being inherited by new characters in part. The inherited secondary body component definition may be based on the particular secondary body component definition as a whole and not in part. In some implementations, a particular secondary body component may include multiple tertiary body components. In some implementations, inheriting a particular secondary body component definition as a whole may imply inheriting the multiple tertiary body components included in the particular secondary body component.

In some implementations, a stakeholder (one or more of a player, character designer, gaming platform administrator, and/or other user) may determine which body component definitions, combinations of body component definitions, and/or hierarchical levels of body component definitions are inheritable at all, or in part, or as a whole. In some implementations, determinations by stakeholders regarding inheritability may include or exclude one or more body component definitions at a particular hierarchical level of body component definitions. For example, if the skin color in FIG. 3A is inheritable, then the skin color for a newly generated character definition may inherit this skin color. For example, if the eyes in FIG. 4B (a combination of component definitions 41$a$ and 41$b$) is not inheritable, then the eyes for a newly generated character definition may be determined in some other manner, e.g., based on a different character. For example, if the eyes in FIG. 4B (a combination of component definitions 41$a$ and 41$b$) are inheritable in part, then the eyes for a newly generated character definition may inherit either from component definition 41$a$, component definition 41$b$, and/or both. For example, if the facial hair in FIG. 4B (a combination of component definitions 41$c$, 41$d$, and 41$e$) are inheritable as a whole, then the facial hair for a newly generated character definition may inherit either from this combination, or not at all, but not from an individual component definition in this combination. In some implementations, determinations by stakeholders regarding inheritability may pertain to (i.e., include or exclude) one or more body component definitions at a particular hierarchical level of body component definitions, such as, e.g., the same level as a particular body component definition. For example, the particular body component definition of an eye at the face level of a particular character may be determined and/or defined by the designer of the particular character such that one or more particular other components at the same level are excluded from being inherited for the same new character as the eye. For example, if a character's face is mostly a giant eye, the particular body component definition may prevent certain facial hair from being inherited for the same new character that has the giant eye, such that the new character does not end up with a moustache in his giant eye. In some implementations, inheriting a particular primary body component definition may necessarily (due to determinations regarding inheritability) include certain secondary and/or tertiary body components and/or exclude certain other secondary and/or tertiary body components. In some implementations, inheriting a particular secondary body component definition may necessarily (due to determinations regarding inheritability) include certain tertiary body components and/or exclude certain other tertiary body components. In some implementations, inheriting a particular tertiary body component definition may necessarily (due to determinations regarding inheritability) include certain tertiary body components and/or exclude certain other tertiary body components, e.g., at the same hierarchical level.

Figure 4A:
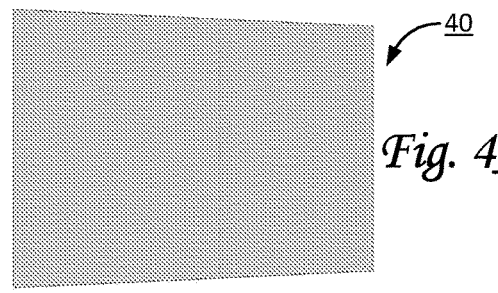
FIGS. 4A-4B-4C-4D illustrate representations of (combinations of) body component definitions for a character as may be used by a system configured for generating characters for a gaming platform based on inheriting characteristics from other characters, in accordance with one or more implementations.
Figure 4B:
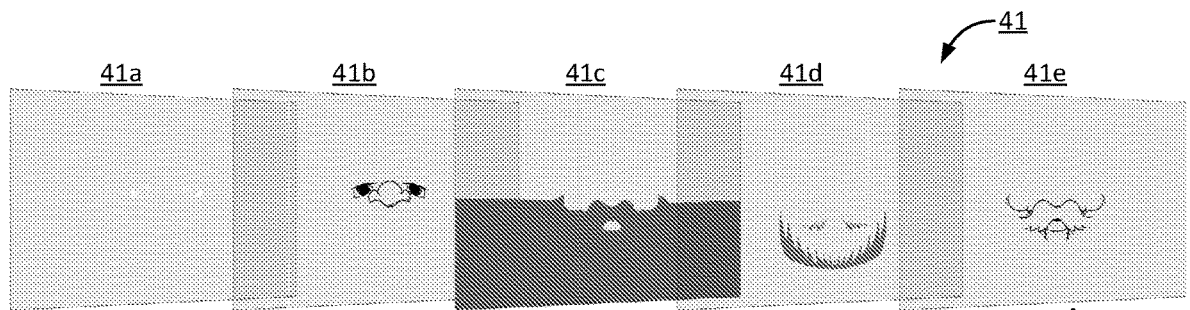
Figure 4C:
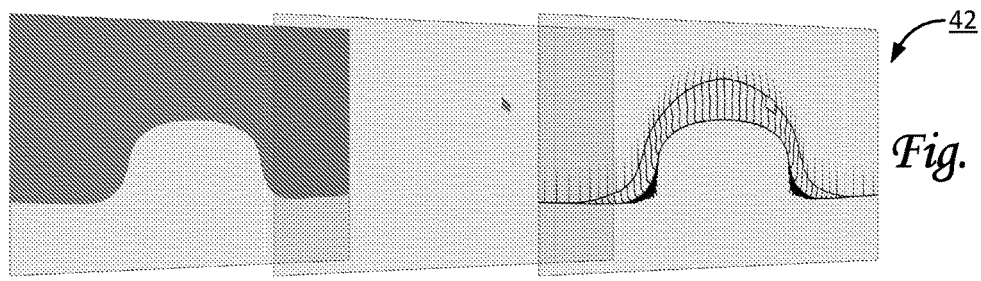
Figure 4D:
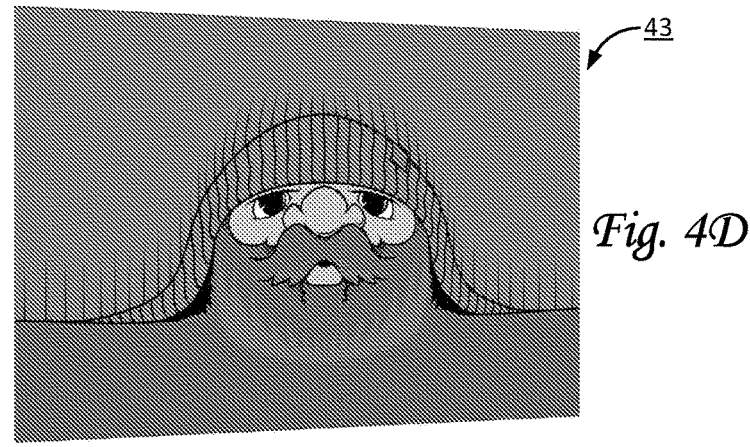
Figure 8:

By way of non-limiting example, FIGS. 5A-5B-5C-5D-5E illustrate representations of (combinations of) body component definitions for an exemplary character having a new character definition that may have been generated by system 100, in particular character component 114. Assume a player has selected character 60 (FIG. 6) and character 70 (FIG. 7) to be used in generating a new character, and that for the head of this new character, the body component definitions depicted in FIGS. 3A-3B-4A-4B-4C are used. Character component 114 may generate a new hierarchical set of body component definitions. This new set may include, e.g., a skin color represented by a representation 50 in FIG. 5A (inherited from representation 30 in FIG. 3A), a face and eyes represented by a representation 51 in FIG. 5B (inherited from representation 31 in FIG. 3B), and a hat represented by a representation 52 in FIG. 5C (inherited from representation 42 in FIG. 4C). In some implementations, the body component definition represented by representation 53 in FIG. 5D may be a combination and/or assembly of the body component definitions shown in FIGS. 5A-5B-5C. In some implementations, if the facial hair in FIG. 4B is separately inheritable, the new set may include facial hair, resulting in the body component definition represented by representation 54 in FIG. 5E, which may be a combination and/or assembly of the body component definitions shown in FIGS. 5A-5B-5C and part of FIG. 4B. By way of non-limiting example, FIG. 8 illustrates a representation of a character 80 as may have been generated by system 100 (e.g., based on and/or related to representation 53 in FIG. 5D). As depicted in FIG. 8, character 80 may have inherited some characteristics of character 60 in FIG. 6 and some characteristics of character 70 in FIG. 7.

Referring to FIG. 1, in some implementations, presentation component 110 may be configured to present new characters on user interface 128. Presentation of a new character may be in accordance with a particular visual representation of the new character. The particular visual representation may be defined by the generated new character definition. Presenting the new character may include assembling individual ones of the inherited primary and secondary body components in order according to a new hierarchy. In some implementations, multiple available and/or possible new character definitions may be used to present multiple (possible) new characters, e.g., at the same time. For example, in some implementations, a user may choose a preferred new character from multiple (possible) new characters that are presented by presentation component 110. In some implementations, system 100 may repeatedly generate and present new characters to a user until the user selects his or her preferred newly generated character.

Game component 118 may be configured to execute an instance of an online game within gaming platform 105. Game component 118 may be configured to implement the instance of the online game by receiving and executing commands (e.g., from players, through client computing platforms 104). At least part of the online game may take place in a virtual space that includes a simulated topography. The commands may be received from players through client computing platforms 104 associated with the players. Execution of the commands may facilitate interactions between the players. The execution of the commands may further facilitate locomotion of user-controlled objects within the simulated topography of the virtual space. The user-controlled objects may include one or more (newly generated) characters. Implementing the instance of the online game may include determining view information for presentation of the online game to the players on client computing platforms 104.

Game interface component 120 may be configured to present view information of the online game to players. For example, the presented view information may include the particular visual representation of a newly generated character. In some implementations, the presented view information may include the particular visual representation of characters within the simulated topography of the virtual space.

In some implementations, server(s) 102, client computing platform(s) 104, gaming platform(s) 105, external resources 122, and/or other components of system 100 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, gaming platform(s) 105, external resources 122, and/or other components of system 100 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users and system 100 and/or between users and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, game controller, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 122 may include sources of information outside of system 100, external entities participating with system 100, and/or other resources. In some implementations, some or all of the functionality attributed herein to external resources 122 may be provided by resources included in system 100. In some implementations, external resources 122 may include external game servers that may provide character definitions.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s)102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102, and/or other components of system 100. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 108, 110, 112, 114, 118, and/or 120, and/or other components. Processor(s) 126 may be configured to execute components 108, 110, 112, 114, 118, and/or 120, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 118, and/or 120 are illustrated in FIG. 1 as being implemented within a single processing unit, in implementations in which processor(s) 126 includes multiple processing units, one or more of components 108, 110, 112, 114, 118, and/or 120 may be implemented remotely from the other components. The description of the functionality provided by the different components 108, 110, 112, 114, 118, and/or 120 described below is for illustrative purposes, and is not intended to be limiting, as any of components 108, 110, 112, 114, 118, and/or 120 may provide more or less functionality than is described. For example, one or more of components 108, 110, 112, 114, 118, and/or 120 may be eliminated, and some or all of its functionality may be provided by other ones of components 108, 110, 112, 114, 118, and/or 120. As another example, processor(s) 126 may be configured to execute one or more additional components that may perform some or all of the functionality attributed below to one of components 108, 110, 112, 114, 118, and/or 120.

Figure 2:
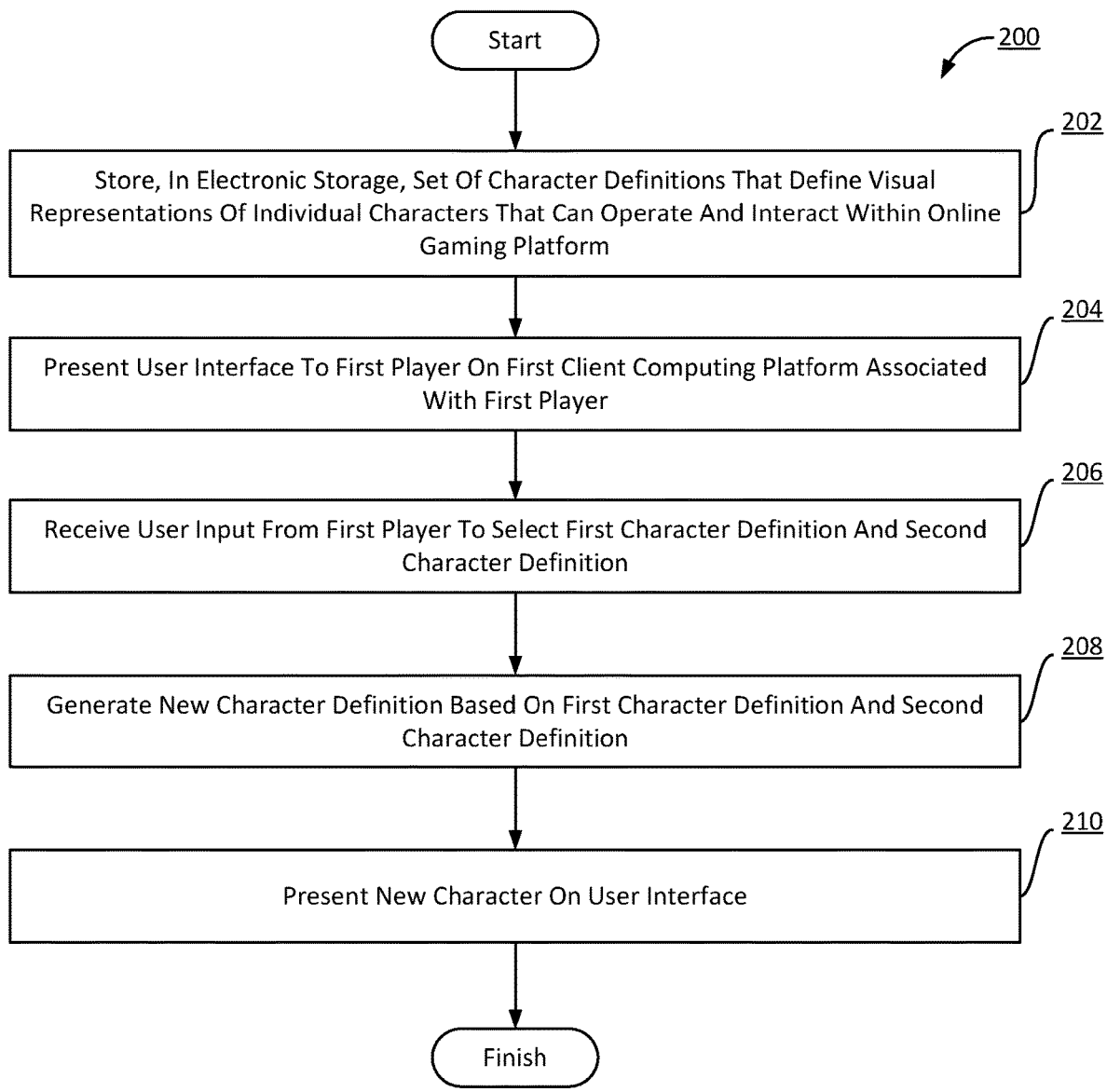
FIG. 2 illustrates a method for generating characters for a gaming platform based on inheriting characteristics from other characters, in accordance with one or more implementations.

FIG. 2 illustrates a method 200 for generating characters for a gaming platform based on inheriting characteristics from other characters, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in electronic storage, a set of character definitions that define visual representations of individual characters that can operate and interact within the gaming platform. Individual ones of the character definitions may include a hierarchical set of body component definitions that define primary body components and secondary body components organized in a hierarchy. Individual ones of the primary body components may include one or more secondary body components. Operation 202 may be performed by one or more hardware processors configured by machine-readable instructions including a component that is the same as or similar to storage component 108, in accordance with one or more implementations.

An operation 204 may include presenting a user interface to a first player on a first client computing platform associated with the first player. The user interface may display one or more of the individual characters in accordance with the visual representations defined by the set of character definitions. The set of character definitions may include a first character definition defining a first visual representation of a first character and a second character definition defining a second visual representation of a second character. Operation 204 may be performed by one or more hardware processors configured by machine-readable instructions including a component that is the same as or similar to presentation component 110, in accordance with one or more implementations.

An operation 206 may include receiving user input from the first player. The user input may include first user input that indicates a first selection of the first character to be used in generating a new character through inheritance. The first character definition may include a first primary body component definition that defines a first primary body component capable of being inherited by the new character in part or as a whole. The first character definition may further include a first secondary body component definition that defines a first secondary body component only capable of being inherited by the new character as a whole and not capable of being inherited by the new character in part. The user input may further include second user input from the first player that indicates a second selection of the second character to be used in generating the new character through inheritance. Operation 206 may be performed by one or more hardware processors configured by machine-readable instructions including a component that is the same as or similar to input component 112, in accordance with one or more implementations.

An operation 208 may include generating a new character definition based on the first character definition and the second character definition. The new character definition may include a new hierarchical set of new body component definitions that define new primary body components and new secondary body components organized in a new hierarchy. Generating the new character definition may include, for individual ones of the new body component definitions, determining whether the new character definition inherits from the first character definition or the second character definition. Operation 208 may be performed by one or more hardware processors configured by machine-readable instructions including a component that is the same as or similar to character component 114, in accordance with one or more implementations.

An operation 210 may include presenting the new character on the user interface. Presentation of the new character may be in accordance with a particular visual representation of the new character. The particular visual representation may be defined by the generated new character definition. Presenting the new character may include assembling individual ones of the new primary and secondary body components in order according to the new hierarchy. Operation 210 may be performed by one or more hardware processors configured by machine-readable instructions including a component that is the same as or similar to presentation component 110, in accordance with one or more implementations.

In some implementations, the concepts described herein regarding inheritance of characteristics may be applied to designs for any virtual objects and/or real-world objects. For example, a graffiti design may be the first selected character and/or object, and a skateboard (real or virtual) may be the second selected character and/or object. By using a hierarchical set of body component definitions for each, character component 114 may be configured to generate a new character definition for a design that inherits characteristics from both selected characters and/or objects.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating characters for a gaming platform based on inheriting characteristics from other characters, the system comprising:
   electronic storage configured to electronically store information, wherein the information includes a set of character definitions that define visual representations of individual characters that can operate and interact within the gaming platform, wherein individual ones of the character definitions include a hierarchical set of body component definitions that define primary body components and secondary body components, wherein the primary body components and the secondary body components are organized in a hierarchy having different levels, wherein individual ones of the primary body components include one or more secondary body components, wherein the set of character definitions includes a first character definition defining a first visual representation of a first character and a second character definition defining a second visual representation of a second character, wherein the first character definition includes a first hierarchical set of body component definitions, and wherein the second character definition includes a second hierarchical set of body component definitions; and
   one or more hardware processors configured by machine-readable instructions to:
      present a user interface to a first player on a first client computing platform associated with the first player, wherein the user interface displays one or more of the individual characters including the first character and the second character;
      receive user input from the first player, wherein the user input indicates a first selection of the first character to be used in generating a new character through inheritance, wherein the first hierarchical set of the first character definition includes:
         a first primary body component definition that is capable of being inherited by the new character in part or as a whole, wherein the first primary body component definition includes:
            a first secondary body component definition organized in the first hierarchical set, wherein the first secondary body component definition is only capable of being inherited by the new character as a whole and not capable of being inherited by the new character in part, and
      wherein the user input further indicates a second selection of the second character to be used in generating the new character through inheritance, wherein the second hierarchical set of the second character definition includes:
         a second primary body component definition that is capable of being inherited by the new character in part or as a whole, wherein the second primary body component definition includes:
            a second secondary body component definition organized in the second hierarchical set, wherein the second secondary body component definition is capable of being inherited by the new character in part or as a whole,
            a third secondary body component definition organized in the second hierarchical set, wherein the third secondary body component definition is capable of being inherited by the new character in part or as a whole, and
            a fourth secondary body component definition organized in the second hierarchical set that is capable of being inherited by the new character in part or as a whole;
      determine an inheritance of the new character at primary body component level, wherein the new character inherits from the first character the first primary body component definition in part and further inherits from the second character the second primary body component definition in part;
      determine further for the inheritance of the new character at secondary body component level that the new character inherits from the first character the first secondary body component definition as a whole and not in part;

determine further for the inheritance of the new character at the secondary body component level that the new character inherits from the second character one or more of the third and fourth secondary body component definitions;

generate a new character definition based on the determined inheritance, wherein the new character definition includes a new hierarchical set of new body component definitions that define new primary body components and new secondary body components organized in a new hierarchy having different levels, wherein the new character definition includes the first secondary body component definition inherited from the first character, and one or more of the third secondary body component definition and the fourth secondary body component definition inherited from the second character;

assemble the new character according to the new hierarchy of the new character definition; and present the new character on the user interface, wherein presentation of the new character is in accordance with a particular visual representation of the new character, wherein the particular visual representation is defined by the generated new character definition.

2. The system of claim 1, wherein:
the primary body components include a head and the secondary body components include one or more of a face, headwear, and hair such that
the first primary body component definition defines a first head of the first character,
the first secondary body component definition defines a first face of the first user,
the second primary body component definition defines a second head of the second character,
the second secondary body component definition defines a second face of the second character,
the third secondary body component definition defines headwear of the second character, and
the fourth secondary body component definition defines hair of the second character,
such that the new character has the first face, and the headwear and hair of the second character.

3. The system of claim 1, wherein the secondary body components include one or more eyes.

4. The system of claim 1, wherein determining whether the new character definition inherits from the first character definition or the second character definition is performed stochastically and/or pseudo-stochastically in accordance with one or more probabilities.

5. The system of claim 1, wherein the new character definition includes a new primary body component definition, wherein the new primary body component definition is based on the first primary body component definition in part and the second primary body component definition in part.

6. The system of claim 1, wherein the new character definition includes a new secondary body component definition, wherein the new secondary body component definition is based on the first secondary body component definition as a whole and not in part.

7. The system of claim 1, wherein the one or more hardware processors are further configured by machine-readable instructions to:

execute an instance of an online game within the gaming platform and implementing the instance of the online game by receiving and executing commands, wherein the commands are received from players through client computing platforms associated with the players, wherein the players include the first player, wherein the client computing platforms include the first client computing platform, wherein execution of the commands facilitates interactions between the players, wherein implementing the instance of the online game includes determining view information for presentation of the online game to the players on the client computing platforms; and present the view information of the online game to the first player, such that the presented view information includes the particular visual representation of the new character.

8. The system of claim 7, wherein at least part of the online game takes place in a virtual space that includes a simulated topography, wherein the execution of the commands further facilitates locomotion of user-controlled objects within the simulated topography of the virtual space, wherein the user-controlled objects include the new character, and wherein the presented view information includes the particular visual representation of the new character within the simulated topography of the virtual space.

9. The system of claim 2, wherein individual ones of the secondary body components include one or more tertiary body components.

10. The system of claim 9, wherein the first face of the first character includes multiple tertiary body components that are implicitly inherited as a whole with inheritance of the first face, the multiple tertiary components including eyes, nose, and mouth of the first character, wherein generating the new character definition includes determining that the new character definition inherits the first face of the first character defined by the first secondary body component definition, such that the new character has a face inherited from the first character and the multiple tertiary body components.

11. A method for generating characters for a gaming platform based on inheriting characteristics from other characters, the method comprising:

storing, in electronic storage, a set of character definitions that define visual representations of individual characters that can operate and interact within the gaming platform, wherein individual ones of the character definitions include a hierarchical set of body component definitions that define primary body components and secondary body components, wherein the primary body components and the secondary body components are organized in a hierarchy having different levels, wherein individual ones of the primary body components include one or more secondary body components, wherein the set of character definitions includes a first character definition defining a first visual representation of a first character and a second character definition defining a second visual representation of a second character, wherein the first character definition includes a first hierarchical set of body component definitions, and wherein the second character definition includes a second hierarchical set of body component definitions;

presenting a user interface to a first player on a first client computing platform associated with the first player, wherein the user interface displays one or more of the individual characters including the first character and the second character;

receiving user input from the first player, wherein the user input indicates a first selection of the first character to be used in generating a new character through inheritance, wherein the first hierarchical set of the first character definition includes:
- a first primary body component definition that is capable of being inherited by the new character in part or as a whole, wherein the first primary body component definition includes:
  - a first secondary body component definition organized in the first hierarchical set, wherein the first secondary body component definition is only capable of being inherited by the new character as a whole and not capable of being inherited by the new character in part, and wherein the user input further indicates a second selection of the second character to be used in generating the new character through inheritance, wherein the second hierarchical set of the second character definition includes:
- a second primary body component definition that is capable of being inherited by the new character in part or as a whole, wherein the second primary body component definition includes:
  - a second secondary body component definition organized in the second hierarchical set, wherein the second secondary body component definition is capable of being inherited by the new character in part or as a whole,
  - a third secondary body component definition organized in the second hierarchical set, wherein the third secondary body component definition is capable of being inherited by the new character in part or as a whole, and
  - a fourth secondary body component definition organized in the second hierarchical set that is capable of being inherited by the new character in part or as a whole;

determining an inheritance of the new character at primary body component level, wherein the new character inherits from the first character the first primary body component definition in part and further inherits from the second character the second primary body component definition in part;

determining further for the inheritance of the new character at secondary body component level that the new character inherits from the first character the first secondary body component definition as a whole and not in part;

determining further for the inheritance of the new character at the secondary body component level that the new character inherits from the second character one or more of the third and fourth secondary body component definitions;

generating a new character definition based on the determined inheritance, wherein the new character definition includes a new hierarchical set of new body component definitions that define new primary body components and new secondary body components organized in a new hierarchy having different levels, wherein the new character definition includes the first secondary body component definition inherited from the first character, and one or more of the third secondary body component definition and the fourth secondary body component definition inherited from the second character;

assembling the new character according to the new hierarchy of the new character definition; and presenting the new character on the user interface, wherein presentation of the new character is in accordance with a particular visual representation of the new character, wherein the particular visual representation is defined by the generated new character definition.

12. The method of claim 11, wherein:
the primary body components include a head and the secondary body components include one or more of a face, headwear, and hair such that
the first primary body component definition defines a first head of the first character,
the first secondary body component definition defines a first face of the first user,
the second primary body component definition defines a second head of the second character,
the second secondary body component definition defines a second face of the second character,
the third secondary body component definition defines headwear of the second character, and
the fourth secondary body component definition defines hair of the second character,
such that the new character has the first face, and the headwear and hair of the second character.

13. The method of claim 11, wherein the secondary body components include one or more eyes.

14. The method of claim 11, wherein determining whether the new character definition inherits from the first character definition or the second character definition is performed stochastically and/or pseudo-stochastically in accordance with one or more probabilities.

15. The method of claim 11, wherein the new character definition includes a new primary body component definition, wherein the new primary body component definition is based on the first primary body component definition in part and the second primary body component definition in part.

16. The method of claim 11, wherein the new character definition includes a new secondary body component definition, wherein the new secondary body component definition is based on the first secondary body component definition as a whole and not in part.

17. The method of claim 11, further comprising:
executing an instance of an online game within the gaming platform and implementing the instance of the online game by receiving and executing commands, wherein the commands are received from players through client computing platforms associated with the players, wherein the players include the first player, wherein the client computing platforms include the first client computing platform, wherein execution of the commands facilitates interactions between the players, wherein implementing the instance of the online game includes determining view information for presentation of the online game to the players on the client computing platforms; and
presenting the view information of the online game to the first player, such that the presented view information includes the particular visual representation of the new character.

18. The method of claim 17, wherein at least part of the online game takes place in a virtual space that includes a simulated topography, wherein the execution of the commands further facilitates locomotion of user-controlled objects within the simulated topography of the virtual space, wherein the user-controlled objects include the new character, and wherein the presented view information includes the particular visual representation of the new character within the simulated topography of the virtual space.

19. The method of claim 12, wherein individual ones of the secondary body components include one or more tertiary body components.

20. The method of claim 19, wherein the first face of the first character includes multiple tertiary body components that are implicitly inherited as a whole with inheritance of the first face, the multiple tertiary body components including eyes, nose, and mouth of the first character, wherein generating the new character definition includes determining that the new character definition inherits the first face of the first character defined by the first secondary body component definition, such that the new character has a face inherited from the first character and the multiple tertiary body components.

* * * * *